United States Patent
Jang et al.

(10) Patent No.: US 11,923,496 B2
(45) Date of Patent: Mar. 5, 2024

(54) SEPARATOR FOR RECHARGEABLE LITHIUM BATTERY AND RECHARGEABLE LITHIUM BATTERY INCLUDING THE SAME

(71) Applicants: SAMSUNG SDI CO., LTD., Yongin-si (KR); SAMSUNG ELECTRONICS CO., LTD., Gyeonggi-do (KR)

(72) Inventors: Jungsue Jang, Suwon-si (KR); Minho Cho, Suwon-si (KR); Hana Kim, Suwon-si (KR); Myungkook Park, Suwon-si (KR); Seung Rim Yang, Seongnam-si (KR); Byungmin Lee, Suwon-si (KR); Bokyung Jung, Suwon-si (KR); Rae Sung Kim, Hwaseong-si (KR)

(73) Assignees: SAMSUNG SDI CO., LTD., Yongin-si (KR); SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 16/807,479

(22) Filed: Mar. 3, 2020

(65) Prior Publication Data
US 2020/0287191 A1  Sep. 10, 2020

(30) Foreign Application Priority Data
Mar. 5, 2019 (KR) .................. 10-2019-0025306

(51) Int. Cl.
*H01M 50/446* (2021.01)
*H01M 10/052* (2010.01)
(Continued)

(52) U.S. Cl.
CPC ....... *H01M 10/052* (2013.01); *H01M 50/414* (2021.01); *H01M 50/42* (2021.01);
(Continued)

(58) Field of Classification Search
CPC ............ H01M 50/411; H01M 50/417; H01M 50/446; H01M 50/449; H01M 50/451; H01M 50/461; H01M 10/0525
See application file for complete search history.

(56) References Cited

U.S. PATENT DOCUMENTS 5,830,603 A * 11/1998 Oka ..................... H01M 50/457
204/296
6,033,806 A * 3/2000 Sugiura ............... H01M 50/414
525/61
(Continued)

FOREIGN PATENT DOCUMENTS

CN 103328209 A 9/2013
CN 103907222 A 7/2014
(Continued)

OTHER PUBLICATIONS

Korean Office action dated Aug. 27, 2021.
(Continued)

*Primary Examiner* — Jeremiah R Smith
(74) *Attorney, Agent, or Firm* — Lee IP Law, P.C.

(57) ABSTRACT

A separator for a rechargeable lithium battery and a rechargeable lithium battery, the separator including a porous substrate; and a coating layer on at least one surface of the porous substrate, wherein the coating layer includes a binder and inorganic particles, the binder including a polyurethane and a polyvinyl alcohol, and the polyurethane and the polyvinyl alcohol are included in a weight ratio of about 5:5 to about 9:1.

15 Claims, 2 Drawing Sheets

(51) Int. Cl.
*H01M 50/414* (2021.01)
*H01M 50/42* (2021.01)
*H01M 50/451* (2021.01)
*H01M 50/417* (2021.01)

(52) U.S. Cl.
CPC ....... *H01M 50/446* (2021.01); *H01M 50/451* (2021.01); *H01M 50/417* (2021.01)

(56) References Cited

U.S. PATENT DOCUMENTS

| | | | | |
|---|---|---|---|---|
| 6,866,965 | B2* | 3/2005 | Lee | H01M 10/052 |
| | | | | 429/232 |
| 9,926,411 | B1* | 3/2018 | Burdynska | H01M 10/0562 |
| 2002/0102464 | A1* | 8/2002 | Yoshida | H01G 11/30 |
| | | | | 429/300 |
| 2007/0264570 | A1 | 11/2007 | Oh et al. | |
| 2010/0316903 | A1 | 12/2010 | Kim et al. | |
| 2013/0202944 | A1* | 8/2013 | Song | H01M 4/623 |
| | | | | 429/188 |
| 2014/0193692 | A1 | 7/2014 | Yamada et al. | |
| 2014/0272532 | A1 | 9/2014 | Park et al. | |
| 2014/0272597 | A1* | 9/2014 | Mikhaylik | H01M 10/058 |
| | | | | 156/278 |
| 2014/0295170 | A1 | 10/2014 | Kim et al. | |
| 2015/0140404 | A1 | 5/2015 | Yoo et al. | |
| 2016/0133949 | A1* | 5/2016 | Madabusi | H01M 50/411 |
| | | | | 429/508 |
| 2017/0149039 | A1* | 5/2017 | Shon | H01M 50/446 |
| 2021/0336297 | A1* | 10/2021 | Suzuki | H01M 50/403 |

FOREIGN PATENT DOCUMENTS

| | | | | |
|---|---|---|---|---|
| CN | 106905475 | A | 6/2017 | |
| CN | 108155326 | A | 6/2018 | |
| CN | 108206258 | A | 6/2018 | |
| JP | 2011-60470 | A | 3/2011 | |
| JP | 2014-211993 | A | 11/2014 | |
| JP | 2016-134247 | A | 7/2016 | |
| KR | 10-2007-0076144 | A | 7/2007 | |
| KR | 10-1002161 | B1 | 12/2010 | |
| KR | 10-2011-0079098 | A | 7/2011 | |
| KR | 10-2014-0031844 | A | 3/2014 | |
| KR | 2014-031844 | * | 3/2014 | .......... H01M 2/1653 |
| KR | 10-2014-0060044 | A | 5/2014 | |
| KR | 10-2014-0076649 | A | 6/2014 | |
| KR | 10-2014-0112384 | A | 9/2014 | |
| KR | 10-2015-0069781 | A | 6/2015 | |
| WO | WO 2014/092334 | A1 | 6/2014 | |
| WO | WO 2015-084053 | A1 | 6/2015 | |

OTHER PUBLICATIONS

Yukinori Koyama, et al., "Harnessing the Actuation Potential of Solid-State Intercalation Compounds", Adv. Funct. Mater. 2006, 16, 492-498.

Christina Peabody, et al., "The role of mechanically induced separator creep in lithium-ion battery capacity fade", Journal of Power Sources 196 (2011) 8147-8153.

Sheng Shui Zhang, "A review on electrolyte additives for lithium-ion batteries", Journal of Power Sources 162 (2006)1379-1394.

Yu, Fangfang, et al., "Crosslinked waterborne polyurethane with high waterproof performance ", Polym. Chem., 2016, 7, 3913-3922.

Extended European Search Report dated May 6, 2020, of the corresponding European Patent Application No. 20160978.1.

Chinese Office action and Search Report dated Mar. 29, 2022.

* cited by examiner

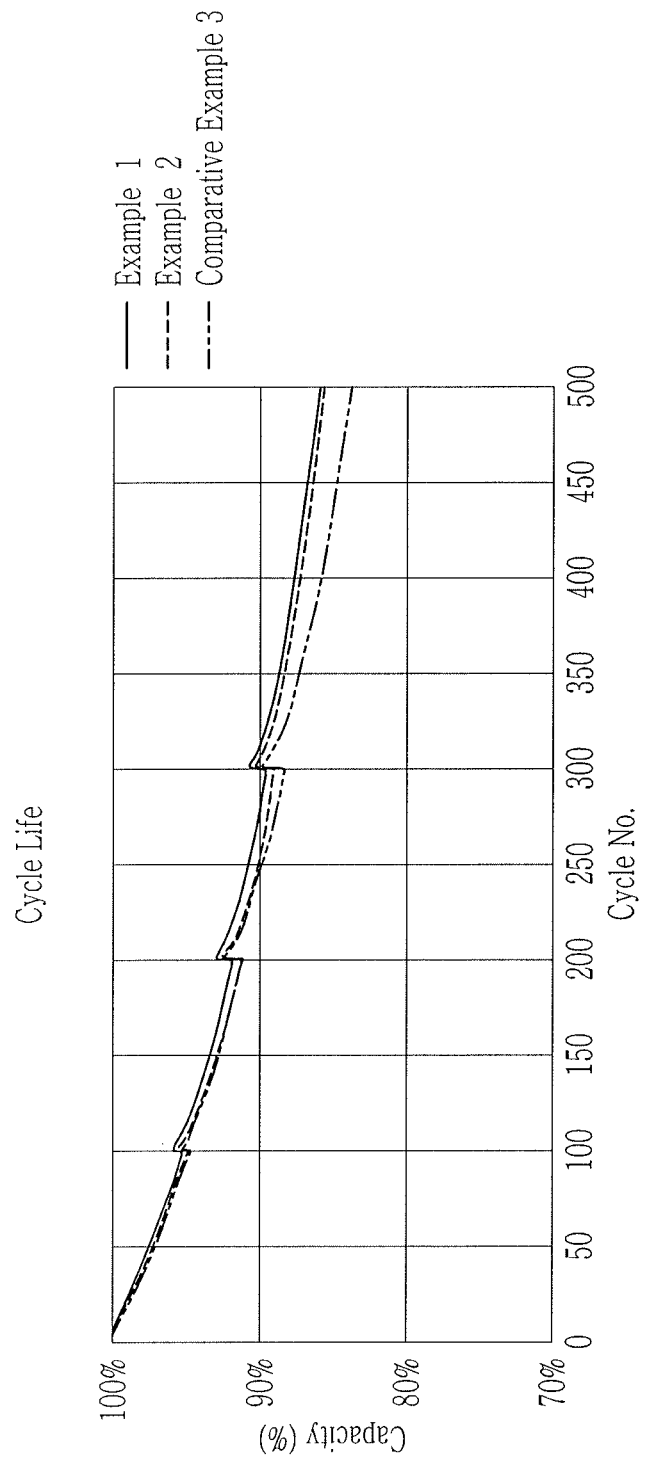

SEPARATOR FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2019-0025306, filed on Mar. 5, 2019, in the Korean Intellectual Property Office, and entitled: "Separator for Rechargeable Lithium Battery and Rechargeable Lithium Battery Including the Same," is incorporated by reference herein in its entirety.

BACKGROUND

1. Field

Embodiments relate to a separator for a rechargeable lithium battery and a rechargeable lithium battery including the same.

2. Description of the Related Art

A separator for an electrochemical battery is an intermediate film that separates a positive electrode and a negative electrode in a battery, and maintains ion conductivity continuously to facilitate charge and discharge of a battery.

SUMMARY

The embodiments may be realized by providing a separator for a rechargeable lithium battery, the separator including a porous substrate; and a coating layer on at least one surface of the porous substrate, wherein the coating layer includes a binder and inorganic particles, the binder including a polyurethane and a polyvinyl alcohol, and the polyurethane and the polyvinyl alcohol are included in a weight ratio of about 5:5 to about 9:1.

The binder may further include a (meth)acryl resin.

The (meth)acryl resin may be included in an amount of about 10 wt % to about 80 wt %, based on a total weight of the binder.

The polyurethane may be included in an amount of about 10 wt % to about 80 wt %, based on a total weight of the binder.

The polyvinyl alcohol may be included in an amount of about 5 wt % to about 30 wt %, based on a total weight of the binder.

The coating layer may further include a cross-linking agent, the cross-linking agent being bound to the polyurethane and/or the inorganic particles.

The cross-linking agent may be bound to the polyurethane to form a cross-linked polymer, and a weight average molecular weight of the cross-linked polymer may be about 500 g/mol to about 80,000 g/mol.

The cross-linking agent may be included in an amount of about 0.03 parts by weight to about 10 parts by weight, based on 100 parts by weight of the binder.

The cross-linking agent may include a carbodiimide compound, a melamine compound, an aziridine compound, an isocyanate compound, or a combination thereof.

The coating layer may further include a dispersant.

The dispersant may be included in an amount of about 0.1 parts by weight to about 10 parts by weight, based on 100 parts by weight of the inorganic particles.

The cross-linking agent may be bound to the inorganic particles and to the polyurethane.

The polyurethane may be a polyether polyurethane.

A weight average molecular weight of the polyether polyurethane may be about 1,000 to about 150,000.

An average polymerization degree of the polyvinyl alcohol may be greater than or equal to about 300, and a saponification degree of the polyvinyl alcohol may be greater than or equal to about 80 mol %.

The inorganic particles may be included in an amount of about 90 wt % to about 99 wt %, based on a total weight of the coating layer.

The embodiments may be realized by providing a rechargeable lithium battery including a positive electrode; a negative electrode; and the separator according to an embodiment between the positive electrode and the negative electrode.

BRIEF DESCRIPTION OF THE DRAWINGS

Features will be apparent to those of skill in the art by describing in detail exemplary embodiments with reference to the attached drawings in which:

FIG. 2 illustrates a graph showing capacity retention during 45° C./500 cycles of the rechargeable lithium battery cells according to Examples 1 and 2 and Comparative Example 3.

DETAILED DESCRIPTION

Figure 1:
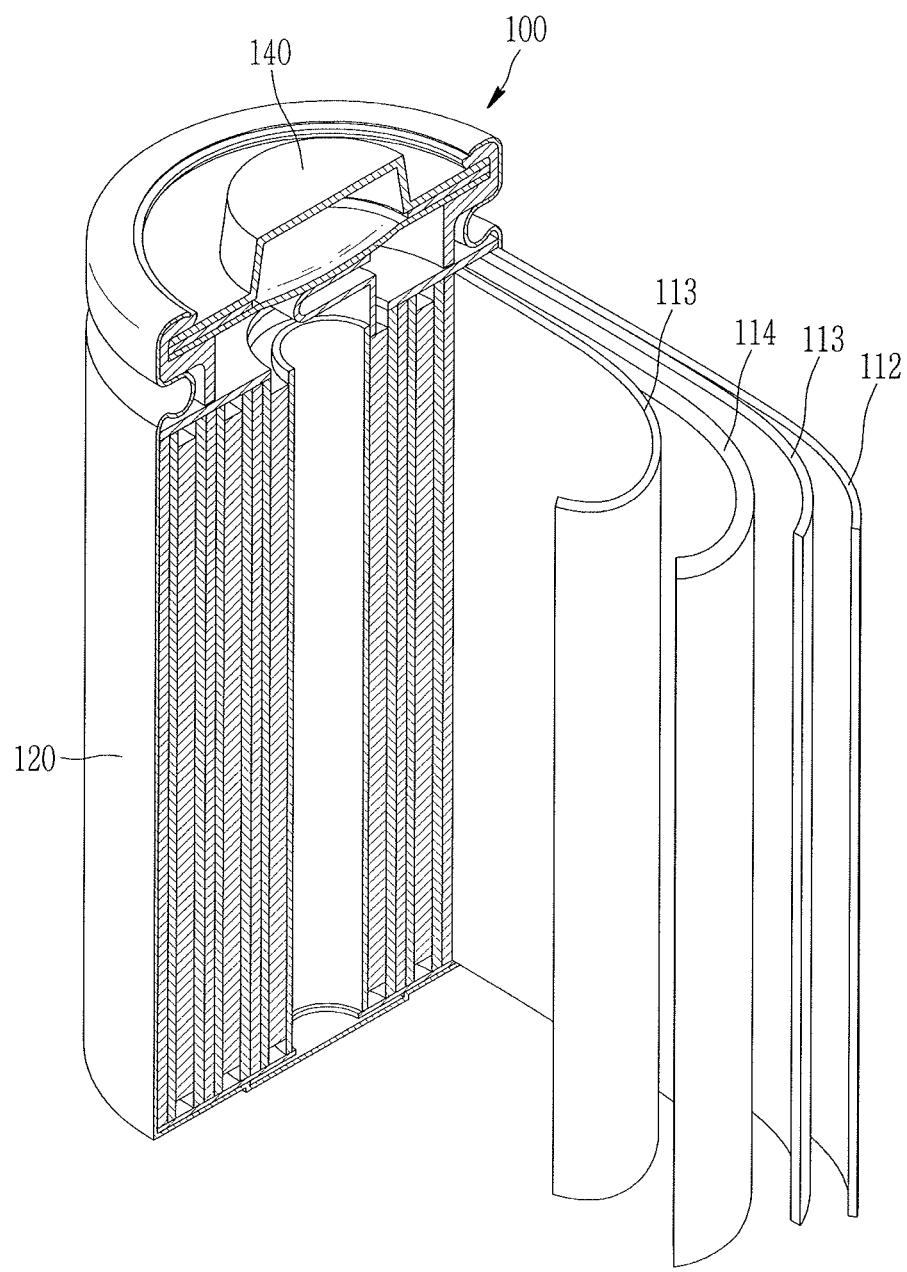
FIG. 1 illustrates an exploded perspective view of a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, "combination thereof" refers to a mixture, a copolymer, a blend, an alloy, a composite, a reaction product of components.

As used herein, "(meth)acryl" may refer to acryl or methacryl.

A separator for a rechargeable lithium battery according to an embodiment may include a porous substrate and a coating layer. The coating layer may include, e.g., a binder (including, e.g., a polyurethane and a polyvinyl alcohol) and inorganic particles. In an implementation, the polyurethane and the polyvinyl alcohol may be included (in the binder) in a weight ratio of, e.g., about 5:5 to about 9:1. In an implementation, the polyurethane and the polyvinyl alcohol may be included in different amounts.

The porous substrate may have a plurality of pores and may be a suitable porous substrate for an electrochemical device. Examples of the porous substrate may include a glass fiber or a polymer film formed of a polymer, or a copolymer or a mixture of two or more selected from polyolefin such as polyethylene, polypropylene, and the like, a polyester such as polyethyleneterephthalate, polybutyleneterephthalate, and the like, polyacetal, polyamide, polyimide, polycarbonate, polyetheretherketone, polyaryletherketone, polyetherimide, polyamideimide, polybenzimidazole, polyethersulfone, polyphenylene oxide, a cyclic olefin copolymer, polyphenylene sulfide, polyethylenenaphthalate, Teflon, and polytetrafluoroethylene.

The porous substrate may be, e.g., a polyolefin substrate, and the polyolefin substrate may improve safety of a battery due to its improved shutdown function. The polyolefin substrate may include, e.g., a polyethylene single film, a polypropylene single film, a polyethylene/polypropylene double film, a polypropylene/polyethylene/polypropylene triple film, or a polyethylene/polypropylene/polyethylene triple film. In an implementation, the polyolefin resin may include a non-olefin resin in addition to an olefin resin or a copolymer of olefin and a non-olefin monomer.

The porous substrate may have a thickness of about 1 μm to about 40 μm, e.g., about 1 μm to about 30 μm, about 1 μm to about 20 μm, about 5 μm to about 20 μM, about 5 μm to about 15 μm, or about 10 μm to about 15 μm.

The coating layer may be on at least one surface of the porous substrate. For example, the coating layer may include the binder (including polyurethane and polyvinyl alcohol) and inorganic particles. For example, a coating layer composition may be coated on one surface of the porous substrate by a gravure coating method to provide the coating layer.

The polyurethane and the polyvinyl alcohol may be applied in the form of a mixed composition.

The polyurethane may be a polymer having a plurality of urethane bonds. The term "urethane bond" refers to a [—NHC(O)O—] structure formed by reacting an active hydroxyl group (—OH) of an alcohol and an isocyanate group (—N=C=O) of an isocyanate, as illustrated in Formula 1.

[Formula 1]

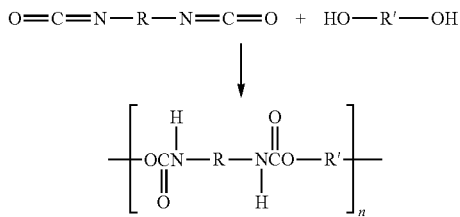

The alcohol as a reactant for forming the polyurethane may include, e.g., a polyether polyol or a polyester polyol.

The polyurethane according to an embodiment may be, e.g., a polyether urethane (e.g., a polyether-based polyurethane) formed from a polyether polyol. In an implementation, the polyether polyol may be, e.g., an alcohol compound or a polymer having a polyvalent active hydroxyl group.

For example, the polyether polyol may be prepared by reacting alkylene oxide with an initiator (such as glycerol). In an implementation, the polyether polyol may be prepared by reacting propylene oxide with an initiator (such as glycerol), or copolymerizing ethylene oxide therewith to prepare a copolymer.

An —OH group of the polyether polyol, e.g., at a terminal end thereof, may react with a polyvalent isocyanate group to provide a polyether polyurethane.

The isocyanate as a reactant that forms the polyurethane may be a suitable isocyanate for preparing polyurethanes.

In an implementation, the isocyanate may include, e.g., an aromatic diisocyanate having 6 to 20 carbon atoms (e.g., excluding carbon in NCO group, and which exclusion applies to the description of numbers of carbon atoms in the isocyanates below), an aliphatic diisocyanate having 2 to 18 carbon atoms, an alicyclic diisocyanate having 4 to 15 carbon atoms, an araliphatic diisocyanate having 8 to 15 carbon atoms, (e.g. a carbodiimide-modified diisocyanate, a urethane-modified diisocyanate, a uretdione-modified diisocyatate, or the like) modified ones of these diisocyanates, and mixtures of two or more types thereof.

As use herein, "araliphatic" may refer to an aliphatic compound containing one or more aryl groups.

Examples of the aromatic diisocyanate may include 1,3- or 1,4-phenylene diisocyanate, 2,4- or 2,6-tolylene diisocyanate, 2,4'- or 4,4'-diphenylmethanedi isocyanate (hereinafter "MDI"), 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, and the like.

Examples of the aliphatic diisocyanate may include ethylene diisocyanate, tetramethylene diisocyanate, hexamethylene diisocyanate, dodecamethylene diisocyanate, 2,2,4-trimethylhexamethylene diisocyanate, lysine diisocyanate, 2,6-diisocyanatomethylcaproate, bis(2-isocyanatoethyl) carbonate, 2-isocyanatoethyl-2,6-diisocyanatohexanoate, and the like.

Examples of the alicyclic diisocyanate may include isophorone diisocyanate, dicyclohexyl methane-4,4'-diisocyanate, cyclohexylene diisocyanate, methylcyclohexylene diisocyanate, bis(2-isocyanatoethyl)-4-cyclohexylene-1,2-dicarboxylate, 2,5- or 2,6-norbornane diisocyanate, and the like.

Examples of the araliphatic diisocyanate may include m- or p-xylylene diisocyanate, α,α,α',α'-tetramethylxylylene diisocyanate, and the like.

In an implementation, the isocyanate may include, e.g., an aromatic diisocyanate or an alicyclic diisocyanate. In an implementation, the isocyanate may include, e.g., MDI.

A weight average molecular weight of the polyether polyurethane may be about 1,000 to about 150,000, e.g., about 10,000 to about 150,000, or about 100,000 to about 150,000.

By including the polyether polyurethane in the binder, a water repellent function may be improved, and water adsorption of the separator may be lowered. For example, a water content of the separator may be lowered, and long-term cycle-life characteristics of the battery may be improved.

The polyvinyl alcohol according to an embodiment may include a suitable polyvinyl alcohol compound.

In an implementation, a saponification degree (measured based on JIS K 6726 (1994 version)) of the polyvinyl alcohol may be greater than or equal to about 80 mol %, e.g., about 80 mol % to about 100 mol %, or about 90 mol % to about 100 mol %, or about 95 mol % to about 100 mol %. Maintaining the saponification degree at greater than or equal to about 80 mol % may help prevent a decrease in the number of hydroxyl groups and the adhesion, thereby helping to ensure that that adhesion performance between the current collector and the active material is maintained.

In an implementation, an average polymerization degree (measured based on JIS K 6726 (1994 version)) of the polyvinyl alcohol may be greater than or equal to about 300, e.g., about 300 to about 3,500, about 500 to about 3,500, or about 1,500 to about 3,500. Maintaining the average polymerization degree at greater than or equal to about 300 may help reduce or prevent a deterioration in mechanical strength, adhesion, and the like. Maintaining the average polymerization degree at, e.g., about 3,500 or less may help prevent a decrease in an elastic force, thereby preventing a decrease in solubility in the solvent during the electrode manufacturing process, facilitating handing.

In another implementation, the polyether polyurethane included in the coating layer according to an embodiment, there is no functional group capable of reacting with the hydroxyl group (—OH) of the polyvinyl alcohol, and the polyether polyurethane and polyvinyl alcohol may have no cross-linking reactivity. As such, they may be present in the composition or the coating layer in a simply mixed form rather than as a cross-linked polymer.

The polyurethane and the polyvinyl alcohol may be included in a weight ratio of about 5:5 to about 9:1.

In an implementation, the polyurethane and the polyvinyl alcohol may be included in a weight ratio of, e.g., about 5:5 to about 8:2 or a weight ratio of about 6:4 to about 8:2.

When the contents of the polyurethane and polyvinyl alcohol are within the above range, water-reducing effects and good ion conductivity of the separator may simultaneously be achieved.

In an implementation, the binder may further include a heat-resistant binder.

The heat-resistant binder may help connect the inorganic particles included in the coating layer in a point contact or a surface contact manner to help prevent the inorganic particles from being detached.

In an implementation, the heat-resistant binder may include, e.g., a (meth)acryl resin.

The (meth)acryl resin may include, e.g., an acrylic copolymer including a repeating unit derived from an alkyl (meth)acrylate monomer as an example of a polymer of a (meth)acrylic monomer. In an implementation, the alkyl (meth)acrylate monomers may include, e.g., n-butyl (meth)acrylate, ethyl (meth)acrylate, propyl (meth)acrylate, t-butyl (meth)acrylate and isobutyl (meth)acrylate, pentyl (meth)acrylate, hexyl (meth)acrylate, heptyl (meth)acrylate, isooctyl (meth)acrylate, octyl (meth)acrylate, nonyl (meth)acrylate, decyl (meth)acrylate, undecyl (meth)acrylate, lauryl (meth)acrylate, methyl (meth)acrylate, isobornyl (meth)acrylate, cyclohexyl (meth)acrylate. For example, straight or branched alkyl (meth)acrylate having 1 to 20 carbon atoms may be used.

In an implementation, the (meth)acryl resin may be included in an amount of about 10 wt % to about 80 wt %, e.g., about 20 wt % to about 70 wt % or about 30 wt % to about 50 wt %, based on a total weight of the binder.

In an implementation, the polyurethane may be included in an amount of about 10 wt % to about 80 wt %, e.g., about 20 wt % to about 80 wt % or about 30 wt % to about 80 wt %, based on the total weight of the binder.

In an implementation, the polyvinyl alcohol may be included in an amount of about 5 wt % to about 30 wt %, e.g., about 10 wt % to about 30 wt % or about 10 wt % to about 25 wt %, based on the total weight of the binder.

Including the (meth)acryl resin in the above range may help ensure not only that the adhesive force of the separator may be improved, but also heat resistance may be ensured.

In addition, by including the polyurethane in the above range, a water-reducing effect may be obtained. In addition, by including the polyvinyl alcohol in the above range, the adhesive effect of the inorganic particles and the film may be obtained.

In an implementation, the heat-resistant binder may be a cross-linked polymer obtained by a reaction of the polyurethane and a cross-linking agent. For example, the coating layer may further include the cross-linking agent, and the cross-linking agent may be bound to the polyurethane to form a cross-linked polymer.

For example, the cross-linking agent may be a monomer, an oligomer, and/or a polymer including a functional group having reactivity with inorganic particles and/or a polar functional group of the polyurethane.

The functional group of the cross-linking agent may form a covalent bond with the polar functional group present in the inorganic particles and/or the polyurethane, and thus may serve to be more firmly bound to the inorganic particles and/or the polyurethane.

In an implementation, in the binder, the polyurethane and the inorganic particles may be organically connected through a cross-linking agent, and as a result, the coating layer may exhibit improved heat resistance without separately including a heat-resistant binder (such as the (meth)acryl resin). In addition, a surface area of the polyurethane exposed on the surface of the coating layer may be increased, thereby improving adhesion to the electrode plate.

In an implementation, the cross-linking agent may be present in the form of a cross-linked polymer which is a resulting material of a reaction with the inorganic particles and/or the polyurethane in a binder.

The cross-linking agent may include a functional group having reactivity with a polar functional group. For example, the cross-linking agent may include a functional group having reactivity with a carboxyl group, a functional group having reactivity with a hydroxy group, a functional group having reactivity an amine group, a functional group having reactivity water, or a combination thereof.

In an implementation, the cross-linking agent may be a monomer, an oligomer, and/or a polymer including a functional group having reactivity a carboxyl group of the polyurethane.

In an implementation, the cross-linking agent may include, e.g., a carbodiimide compound, a melamine compound, an aziridine compound, an isocyanate compound, or a combination thereof. In an implementation, the carbodiimide-based compound may include, e.g., N,N'-di-o-tolylcarbodiimide, N,N'-diphenylcarbodiimide, N,N'-dioctyldecylcarbodiimide, N,N'-di-2,6-diketylphenylcarbodiimide, N-tolyl-N'cyclohexylcarbodiimide, N,N'-di-2,6-diisopropylphenylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolyl carbodiimide, p-phenylene-bisdicyclohexylcarbodiimide, hexamethylene-bisdicyclohexylcarbodiimide, ethylene-bisdiphenylcarbodiimide, benzene-2,4-diisocyanato-1,3,5-tris(1-methylethyl) homopolymer, a copolymer of 2,4-diisocyanato-1,3,5-tris(1-methylethyl) and 2,6-diisopropyl diisocyanate, or a combination thereof.

In the binder, the carbodiimide compound may exist in a form of a cross-linked polymer which is a resulting material of a reaction with or between the inorganic particles and/or the polyurethane. For example, the diimide bond of the carbodiimide compound may react with the carboxyl group of the polyurethane to provide a cross-linked polymer (e.g., cross-linked polyurethane) in which a new covalent bond is formed.

For example, the cross-linking agent may be a silane coupling agent. The silane coupling agent is an organosilicon compound having a hydrolyzable functional group. The hydrolyzable functional group is a functional group capable of bonding with inorganic particles such as silica after hydrolysis. In an implementation, the silane coupling agent may include, e.g., an alkoxy group, a halogen group, an amino group, a vinyl group, a glycidoxy group, or a hydroxy group.

In an implementation, the silane coupling agent may include, e.g., vinylalkylalkoxysilane, epoxyalkylalkoxysilane, mercaptoalkylalkoxysilane, vinylhalosilane, or alkylacyloxysilane.

In an implementation, the silane coupling agent may include, e.g., vinylalkylalkoxysilanes such as vinyltris((3-methoxyethoxy) silane and γ-methacrylooxypropyltrimethoxysilane; epoxy alkylalkoxysilanes such as γ-glycidoxypropyltrimethoxysilane, β-(3,4-epoxycyclohexyl) ethyltrimethoxysilane, and γ-glycidoxypropylmethyldiethoxysilane; aminoalkylalkoxysilanes such as γ-aminopropyltriethoxysilane; mercaptoalkylalkoxysilanes such as γ-mercaptopropyltrimethoxysilane; halogenated alkylalkoxysilanes such as γ-chloropropyltrimethoxysilane; vinyl halosilanes such as vinyl trichlorosilane; alkylacyloxysilanes such as methyltriacetoxysilane; or the like.

In an implementation, a hydrazine compound, a urea compound, an epoxy compound, an oxazoline compound, or the like may be used as a cross-linking agent. In an implementation, a suitable cross-linking agent may be used. These compounds may be used alone or in a mixture.

In an implementation, APA series (APA-M950, APA-M980, APA-P250, APA-P280, etc.) of Otsuka Chemical Co., Ltd. may be used as the hydrazine compound.

In an implementation, BASONAT PLR8878 from BASF, BASONAT HW-100, Bayhydur 3100 from Sumitomo Bayurethane Co., Ltd., Bayheur VPLS2150/1, and the like may be used as the isocyanate compound.

In an implementation, as the melamine compound, Cymel 325 etc. of Mitsui Cytec Company may be used.

In an implementation, as the urea compound, becamine series etc. made by DIC Corporation may be used.

In an implementation, as the epoxy compound, the denacor series (EM-150, EM-101, etc.) by Nagase Chemtech Co., Ltd., and Adegin EM-00517, EM-0526, EM-051R, EM-11-50B by ADEKA Corporation, and the like may be used.

In an implementation, as the carbodiimide compound, carbojilite series of Nisshinbo Chemical Co., Ltd. (SV-02, V-02, V-02-L2, V-04, E-01, E-02, V-01, V-03, V-07, V-09, V-05, and the like may be used.

In an implementation, as the oxazoline compound, Nippon Shokubai's epochross series (WS-500, WS-700, K-1010E, K-1020E, K-1030E, K-2010E, K-2020E, K-2030E), and the like may be used.

These are commercially available as a dispersion body or solution including a cross-linking agent.

In an implementation, the cross-linking agent may be included in an amount of, e.g., 0.03 parts by weight to about 10 parts by weight, based on 100 parts by weight of the binder. In an implementation, the cross-linking may be included in an amount of, e.g., about 0.03 parts by weight to about 7 parts by weight, about 0.1 parts by weight to about 7 parts by weight, or about 1 part by weight to about 7 parts by weight.

When the content of the cross-linking agent satisfies the above range, the cross-linking agent may be sufficiently bound to the polyurethane and/or the inorganic particles, and a rechargeable lithium battery including the same may secure sufficient heat resistance. In an implementation, when the content of the cross-linking agent satisfies the above range, a large amount of unreacted cross-linking agent may not remain, thereby preventing deterioration of characteristics of a rechargeable lithium battery including the same.

The cross-linked polymer may help further improve heat resistance as the cross-linking degree becomes higher.

The cross-linked polymer may have a weight average molecular weight of about 500 g/mol to about 80,000 g/mol, e.g., about 2,000 g/mol to about 60,000 g/mol. Heat resistance may be ensured by including the cross-linked binder which has the weight average molecular weight within the range.

In an implementation, due to the cross-linked structure, impregnation of an electrolyte may be improved, and when the separator is used in a battery, the charge and discharge characteristics of the battery may be improved. In an implementation, binder components are not easily dissolved in the electrolyte by physical and chemical bonds between the molecules constituting the binder.

In an implementation, the composition for forming the coating layer may include a dispersant and a solvent, in addition to the polyurethane and the cross-linking agent.

The dispersant may be included in an amount of, e.g., about 0.1 parts by weight to 10 parts by weight based on 100 parts by weight of the inorganic particles. In an implementation, the dispersant may be included in an amount of, e.g., about 0.1 parts by weight to about 5 parts by weight.

The solvent may include a suitable solvent that is capable of dissolving or dispersing the aforementioned polyurethane, polyvinyl alcohol, (meth)acrylic resin, cross-linking agent, and dispersant. In an implementation, the solvent may include, e.g., water (pure water, ultrapure water, distilled water, ion exchanged water, etc.); alcohols such as methanol, ethanol and isopropyl alcohol; dimethylformamide, dimethylacetamide, tetramethylurea, triethylphosphate, N-methyl-2-pyrrolidone, dimethyl sulfoxide, acetone, methyl ethyl ketone, methyl isobutyl ketone, or cyclohexanone. In an implementation, two or more solvents may be mixed. In an implementation, the aqueous solvent may be used.

The curing may be performed by a method of photocuring, thermal curing, or a combination thereof. The photocuring may be performed, e.g., by irradiating UV at about 150 nm to about 170 nm for about 5 seconds to about 60 seconds.

The thermal curing may be performed, e.g., at a temperature of about 60° C. to about 120° C. for about 1 hour to about 36 hours, or at a temperature of about 80° C. to about 100° C. for about 10 hours to about 24 hours.

The inorganic particles may help prevent the separator from being rapidly contracted or deformed in response to a temperature increase. In an implementation, the inorganic particles may include a ceramic material capable of improving heat resistance, e.g., $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof. The inorganic particles may be, e.g., spherical, plate-shaped, cubic, or amorphous. In an implementation, an average particle diameter of the inorganic particles may be, e.g., about 0.3 μm to about 0.9 μm, for example about 0.4 μm to about 0.9 μm, or about 0.5 μm to about 0.9 μm.

The average particle diameter of the inorganic particles may be a particle size ($D_{50}$) at 50% by volume in a cumulative size-distribution curve. By using inorganic particles having the average particle diameter within the above range, it is possible to impart suitable strength to the coating layer, thereby improving heat resistance, durability, and stability of the separator.

In an implementation, the binder may be included in an amount of about 1 wt % to about 10 wt %, e.g., about 2 wt % to about 8 wt %, based on the total weight of the coating layer.

In an implementation, the inorganic particles may be included in an amount of about 90 wt % to about 99 wt %, based on the total weight of the coating layer. In an implementation, the inorganic particles may be included in an amount of about 92 wt % to about 98 wt %, e.g., about 93 wt % to about 98 wt %, about 94 wt % to about 98 wt %, or about 95 wt % to about 98 wt % based on a total amount of the coating layer.

When the coating layer includes the binder and inorganic particles within the above ranges, the separator for a rechargeable lithium battery may exhibit improved heat resistance, durability, oxidation resistance, and stability.

In an implementation, a thickness of the coating layer may be, e.g., about 3.0 µm to about 7 µm. In an implementation, the thickness may be about 3.0 µm to about 6 µm, or about 3.0 µm to about 5 µm.

In an implementation, a ratio of the thickness of the coating layer relative to the thickness of the porous substrate may be, e.g., about 0.05 to about 0.5, about 0.05 to about 0.4, or about 0.05 to about 0.3. In this case, the separator including the porous substrate and the coating layer may exhibit improved air permeability, heat resistance, and adhesion.

The separator for the rechargeable lithium battery according to an embodiment may be manufactured by suitable methods. For example, the separator for the rechargeable lithium battery may be formed by coating a composition for forming the coating layer on one or both surfaces of the porous substrate and then drying it.

In an implementation, the coating may include, e.g., a spin coating, a dip coating, a bar coating, a die coating, a slit coating, a roll coating, an inkjet printing, or the like.

In an implementation, the drying may be, e.g., performed through natural drying, drying with warm air, hot air, or low humid air, vacuum-drying, or radiation of a far-infrared ray, an electron beam, or the like. In an implementation, drying may be, e.g., performed at a temperature of about 25° C. to about 120° C.

The separator for the rechargeable lithium battery may be manufactured by, e.g., lamination, coextrusion, or the like, in addition or as an alternative to the above method.

Hereinafter, a rechargeable lithium battery including the separator for the rechargeable lithium battery is described.

A rechargeable lithium battery may be classified into a lithium ion battery, a lithium ion polymer battery, and a lithium polymer battery depending on kinds of a separator and an electrolyte. The rechargeable lithium battery also may be classified to be cylindrical, prismatic, coin-type, pouch-type, and the like depending on a shape. In addition, the rechargeable lithium battery may be bulk type and thin film type depending on sizes. Suitable structures and manufacturing methods may be for these batteries.

Herein, as an example of a rechargeable lithium battery, a cylindrical rechargeable lithium battery is described. FIG. 1 illustrates an exploded perspective view showing a rechargeable lithium battery according to an embodiment.

Referring to FIG. 1, a rechargeable lithium battery 100 according to an embodiment may include a battery cell including a negative electrode 112, a positive electrode 114 facing the negative electrode 112, a separator 113 between the negative electrode 112 and the positive electrode 114, and an electrolyte solution immersed in or surrounding the negative electrode 112, positive electrode 114 and separator 113, a battery case 120 housing the battery cell, and a sealing member 140 sealing the battery case 120.

The positive electrode 114 may include a positive current collector and a positive active material layer formed on the positive current collector. The positive active material layer includes a positive active material, a positive electrode binder, and optionally a conductive material.

In an implementation, the positive current collector may include, e.g., aluminum, nickel, or the like.

The positive active material may use a compound capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The positive electrode binder may help improve binding properties of positive active material particles with one another and with a current collector. In an implementation, the positive electrode binder may include, e.g., polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. These may be used alone or as a mixture of two or more.

The conductive material may help improve conductivity of an electrode. In an implementation, the conductive material may include, e.g., natural graphite, artificial graphite, carbon black, a carbon fiber, a metal powder, a metal fiber, or the like. These may be used alone or as a mixture of two or more. The metal powder and the metal fiber may use a metal of copper, nickel, aluminum, silver, or the like.

The negative electrode 112 may include a negative current collector and a negative active material layer formed on the negative current collector.

In an implementation, the negative current collector may include, e.g., copper, gold, nickel, a copper alloy, or the like.

The negative active material layer may include a negative active material, a negative electrode binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material, e.g., a suitable carbon-based negative active material, and examples thereof may include crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, SiO$_x$ (0<x<2), a Si—C composite, a Si—Y' alloy, Sn, SnO$_2$, a Sn—C composite, a Sn—Y' alloy, and the like, and at least one of these may be mixed with SiO$_2$. Specific examples of the element Y' may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may include vanadium oxide, lithium vanadium oxide, or the like.

The negative electrode binder and the conductive material used in the negative electrode 112 may be the same as the positive electrode binder and the conductive material of the aforementioned positive electrode 114.

The positive electrode 114 and the negative electrode 112 may be manufactured by mixing each active material composition including each active material and a binder, and optionally a conductive material in a solvent, and coating the active material composition on each current collector. In an implementation, the solvent may include, e.g., N-methylpyrrolidone or the like.

The electrolyte solution may include an organic solvent a lithium salt.

The organic solvent serves as a medium for transmitting ions taking part in the electrochemical reaction of a battery. The organic solvent may include, e.g., a carbonate solvent, an ester solvent, an ether solvent, a ketone solvent, an alcohol solvent, or an aprotic solvent. The carbonate solvent may include, e.g., dimethyl carbonate, diethyl carbonate, dipropyl carbonate, methylpropyl carbonate, ethylpropyl carbonate, methylethyl carbonate, ethylene carbonate, propylene carbonate, butylene carbonate, or the like. The ester solvent may include, e.g., methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether solvent may include, e.g., dibutyl ether, tetraglyme, diglyme, dimethoxyethane, 2-methyltetrahydrofuran, tetrahydrofuran, or the like. The ketone solvent may include, e.g., cyclohexanone or the like. The alcohol-sed solvent may include, e.g., ethanol, isopropyl alcohol, or the like. The aprotic solvent may include, e.g., nitriles such as R—CN (R is a C2 to C20 linear, branched, or cyclic hydrocarbon group, a double bond, an aromatic ring, or an ether bond), or the like, amides such as dimethyl formamide, dioxolanes such as 1,3-dioxolane, sulfolanes, or the like.

The organic solvent may be used alone or in a mixture of two or more, and when the organic solvent is used in a mixture of two or more, a mixture ratio may be selected in accordance with a desirable cell performance.

The lithium salt may be dissolved in an organic solvent, may supply lithium ions in a battery, may basically operate the rechargeable lithium battery, and may help improve lithium ion transportation between positive and negative electrodes therein. In an implementation, the lithium salt may include, e.g., LiPF$_6$, LiBF$_4$, LiSbF$_6$, LiAsF$_6$, LiN(SO$_3$C$_2$F$_5$)$_2$, LiN(CF$_3$SO$_2$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$) (in which x and y are natural numbers), LiCl, LiI, LiB(C$_2$O$_4$)$_2$, or a combination thereof.

The lithium salt may be used in a concentration of, e.g., about 0.1 M to about 2.0 M. When the lithium salt is included within the above concentration range, an electrolyte may have excellent performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

3.81 parts by weight of a polyether polyurethane (Sancure 2710, Lubrizol), 0.23 parts by weight of a cross-linking agent (Picassian® XL-732, STAHL), 0.95 parts by weight of polyvinyl alcohol (PVA-500, Daejung Chemicals and Metals Co., Ltd.), 95.24 parts by weight of boehmite (Nabaltec AOH60), and 150 parts by weight of DI water were mixed and dispersed with a mechanical stirring equipment at 25° C. for 30 minutes to prepare coating layer composition having a solid content of 40 wt %.

The composition was bar-coated to be 3 μm thick on a 12 μm-thick polyethylene porous substrate (Air permeability: 120 sec/100 cc, Puncture strength: 450 kgf, SK Co., Ltd.) and then, dried at 70° C. for 10 minutes to manufacture a separator for rechargeable lithium battery cell.

Example 2

1.9 parts by weight of a polyether polyurethane (Sancure 2710, Lubrizol), 0.95 parts by weight of polyvinyl alcohol (PVA-500, Daejung Chemicals and Metals Co., Ltd.), 1.9 parts by weight of a (meth)acryl resin (Carbosperse-k-702, Lubrizol), 95.24 parts by weight of boehmite (Nabaltec AOH60), and 150 parts by weight of DI water were mixed and dispersed with a mechanical stirring equipment at 25° C. for 30 minutes to prepare a coating layer composition having a solid content of 40 wt %, and then, the coating layer composition was used to manufacture a separator for a rechargeable battery according to the same method as Example 1.

Comparative Example 1

3.8 parts by weight of a polyether polyurethane (Sancure 2710, Lubrizol), 0.95 parts by weight of polyvinyl alcohol (PVA-500, Daejung Chemicals and Metals Co., Ltd.), 95.24 parts by weight of boehmite (Nabaltec AOH60), and 150 parts by weight of DI water were mixed and dispersed with a mechanical stirring equipment at 25° C. for 30 minutes to prepare a coating layer composition having a solid content of 40 wt %, and then, the coating layer composition was used to manufacture a separator for a rechargeable battery according to the same method as Example 1.

Comparative Example 2

A separator for a rechargeable battery was manufactured according to the same method as Example 1 except that 1.9 parts by weight of a polyester polyurethane (Sancure 835, Lubrizol), 1.9 parts by weight of a (meth)acryl resin (Carbosperse-k-702, Lubrizol), 0.95 parts by weight of polyvinyl alcohol (PVA-500, Daejung Chemicals and Metals Co., Ltd.), 95.24 parts by weight of boehmite (Nabaltec AOH60), and 150 parts by weight of DI water were used instead of the polyether-based polyurethane.

Comparative Example 3

3.8 parts by weight of a (meth)acryl resin (Carbosperse-k-702, Lubrizol), 0.95 parts by weight of polyvinyl alcohol (PVA-500, Daejung Chemicals and Metals Co., Ltd.), 95.24 parts by weight of boehmite (Nabaltec AOH60), and 150 parts by weight of DI water were mixed and dispersed with a mechanical stirring equipment at 25° C. for 30 minutes to prepare a coating layer composition having a solid content of 40 wt %, and then, the coating layer composition was used to manufacture a separator for a rechargeable battery according to the same method as Example 1.

Evaluation Example 1: Evaluation of Moisture Characteristics

The separators respectively having a coating layer (after removing a package when packed) were stored in an 80° C. chamber for 24 hours, and stored in an 17° C. to 20° C., at a dew point of −80° C. to −90° C. for 24 hours, and then, 2.0 g to 3.0 g of each separator was loaded in a capping vial. The vial was put in 860 Thermoprep (Metrohm AG) and heated at 150° C., and moisture contents (X ppm) of the separators were measured through automatic moisture measurement in a Karl-Fisher method for 10 minutes with 831 KF coulometer (Metrohm AG).

The results are shown in Table 1.

Evaluation Example 2: High-Temperature Shrinkage Rate Characteristics of Separators The separators were respectively cut into a width (MD) of about 10 cm×a length (TD) of about 10 cm, stored in a 200° C. chamber for 10 minutes, and then, measured with respect to a shrinkage rate in a MD direction and in a TD direction to respectively calculate an MD direction thermal shrinkage rate and a TD direction thermal shrinkage rate according to Formulae 2 and 3, and large measurements among the MD direction thermal shrinkage rates and the TD direction thermal shrinkage rates were provided as final values in Table 1.

Thermal shrinkage rate in *MD* direction=(*MD* direction length after evaluation of high-temperature shrinkage/*MD* direction length of the separator before evaluation)×100     [Formula 2]

Thermal shrinkage rate in *TD* direction=(*TD* direction length after evaluation of high-temperature shrinkage/*TD* direction length of the separator before evaluation     [Formula 3]

The calculated values according to Formulae 2 and 3 are shown in Table 1.

TABLE 1

|  | Drying at 80° C. for 24 hr (ppm) | Thermal shrinkage rate (200° C. 1 hr (%)) |
|---|---|---|
| Example 1 | 167 | 5%↓ |
| Example 2 | 353 | 5%↓ |
| Comparative Example 1 | 170 | 30%↑ |
| Comparative Example 2 | 1200 | 5%↓ |
| Comparative Example 3 | 1200 | 5%↓ |

Referring to Table 1, the separators including polyurethane and a (meth)acryl resin or a cross-linked polymer obtained by a reaction of the polyurethane and a cross-linking agent exhibited improved water repellent. For example, when a polyether polyurethane was used rather than polyester polyurethane (Comparative Example 2), moisture-reducing characteristics were much improved.

In addition, the separators including the polyurethane and the (meth)acryl resin or the cross-linked polymer obtained by a reaction of the polyurethane and the cross-linking agent exhibited improved heat-resistance properties.

Evaluation Example 3: Evaluation of High-Temperature Cycle-Life Characteristics (Manufacture of Rechargeable Battery Cells)

$LiCoO_2$ as a positive active material, polyvinylidene fluoride (PVDF) as a binder, and carbon as a conductive agent were mixed in a weight ratio of 92:4:4 and then, dispersed in N-methyl-2-pyrrolidone to prepare positive electrode slurry. This slurry was coated to be 20 μm thick on an aluminum foil and then, dried and compressed to manufacture a positive electrode.

Artificial graphite as a negative electrode active material, a styrene-butadiene rubber as a binder, and carboxylmethyl cellulose as a thickener were mixed in a weight ratio of 96:2:2 and dispersed in water to prepare negative electrode active material slurry. This slurry was coated to be 15 μm thick on a copper foil and then, dried and compressed to manufacture a negative electrode.

The manufactured positive and negative electrodes and the separators according to Examples 1 to 2 and Comparative Example 3 respectively were used to manufacture cylindrical battery cells. An electrolyte solution was prepared by using a mixed solution of ethyl carbonate (EC)/ethylmethyl carbonate (EMC)/diethyl carbonate (DEC) (a volume ratio of 3/5/2) including $LiPF_6$ at a concentration of 1.3 M.

(Evaluation of High-Temperature Cycle-Life Characteristics)

The lithium rechargeable battery cells according to Examples 1 and 2 and Comparative Example 3 were charged and discharged at 45° C. in a range of 2.8 V to 4.2 V to conduct a standard charge and discharge experiment.

Subsequently, the cells were constant current-charged in a high temperature (45° C.) chamber at a current of 1.0 C rate up to 4.25 V and then, constant voltage-charged until the current reached 0.05 C while 4.25 V was maintained. Then, the cells were discharged down to a voltage of 2.8 V at a constant current of 1.0 C. This standard charge and standard discharge was performed once every $100^{th}$ charge and discharge. These charges and discharges were repeated up to 500 cycles to evaluate cycle-life characteristics. The cells were respectively measured with respect to discharge capacity at each cycle and discharge capacity at the $500^{th}$ cycle, which were used to calculate cycle capacity retention (%) at a high temperature (45° C.) according to Formula 4. The results are shown in FIG. 2.

High-temperature (45° C.) cycle capacity retention (%)=(discharge capacity at 500 cycles/discharge capacity at first cycle)×100     [Formula 4]

FIG. 2 illustrates a graph showing capacity retention during 45° C./500 cycles.

Referring to FIG. 2, the rechargeable lithium battery cells manufactured according to Examples 1 and 2 were more improved in terms of high-temperature (45° C.) cycle capacity retention (%), compared with the rechargeable lithium battery cell manufactured according to Comparative Example 3.

For example, the separators manufactured according to the Examples included a coating layer including the polyether polyurethane, thereby realizing a separator having improved thermal stability and moisture resistance, and implementing a rechargeable battery having improved cycle-life characteristics.

By way of summation and review, when a battery is exposed to a high temperature environment due to abnormal behavior, the separator could mechanically shrink or could be damaged due to melting characteristics at a low temperature. The positive and negative electrodes could contact each other and may cause an explosion of the battery. For example, shrinkage of a separator may be suppressed, and safety of a battery may be improved.

Thermal resistance of the separator could be increased by mixing a heat-resistant binder with inorganic particles and coating a separator. As the heat-resistant binder, an SBR binder or an aqueous binder may be used.

In the case of the SBR binder, mechanical properties of the SBR binder may be relatively low, leading to deterioration of long-term cycle-life characteristics of the battery.

As the aqueous binder, an acrylic binder may be applied in a form of a salt dissolved in water so as to help improve a binding strength with the inorganic particles, and thus a moisture content of the separator may be increased due to moisture absorption of the salt, which may reduce long-term cycle-life characteristics of the battery.

In a rechargeable lithium battery having excellent cycle-life characteristics, a separator may be capable of lowering a moisture content in the separator while having high heat resistance.

One or more embodiments may provide a separator having a low content of residual moisture and a low shrinkage ratio at a high temperature, and a rechargeable lithium battery having excellent cycle-life characteristics and heat resistance characteristics.

One or more embodiments may provide a rechargeable lithium battery having a low content of residual moisture and a low shrinkage ratio at a high temperature, thereby ensuring both cycle-life characteristics and a heat resistance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a rechargeable lithium battery, the separator comprising:
   a porous substrate; and
   a coating layer on at least one surface of the porous substrate,
   wherein:
   the coating layer includes a binder and inorganic particles, the binder including:
   a polyether polyurethane,
   a polyvinyl alcohol, and
   a cross-linking agent,
   the polyether polyurethane and the polyvinyl alcohol are included in a weight ratio of 5:5 to 9:1,
   the cross-linking agent includes a carbodiimide compound,
   the cross-linking agent is bound to the polyether polyurethane to form a cross-linked polymer, and
   a weight average molecular weight of the cross-linked polymer is 500 g/mol to 80,000 g/mol.

2. The separator as claimed in claim 1, wherein the polyether polyurethane is included in an amount of 10 wt % to 80 wt %, based on a total weight of the binder.

3. The separator as claimed in claim 1, wherein the polyvinyl alcohol is included in an amount of 5 wt % to 30 wt %, based on a total weight of the binder.

4. The separator as claimed in claim 1, wherein the cross-linking agent is also bound to the inorganic particles.

5. The separator as claimed in claim 1, wherein the cross-linking agent is included in an amount of 0.03 parts by weight to 10 parts by weight, based on 100 parts by weight of the binder.

6. The separator as claimed in claim 4, wherein the cross-linking agent is covalently bonded to the inorganic particles and covalently bonded to the polyether polyurethane.

7. The separator as claimed in claim 4, wherein the coating layer further includes a dispersant.

8. The separator as claimed in claim 7, wherein the dispersant is included in an amount of 0.1 parts by weight to 10 parts by weight, based on 100 parts by weight of the inorganic particles.

9. The separator as claimed in claim 1, wherein a weight average molecular weight of the polyether polyurethane is 1,000 g/mol to 150,000 g/mol.

10. The separator as claimed in claim 1, wherein:
    an average polymerization degree of the polyvinyl alcohol is greater than or equal to 300, and
    a saponification degree of the polyvinyl alcohol is greater than or equal to 80 mol %.

11. The separator as claimed in claim 1, wherein the inorganic particles are included in an amount of 90 wt % to 99 wt %, based on a total weight of the coating layer.

12. The separator as claimed in claim 1, wherein the binder further includes a (meth)acryl resin.

13. The separator as claimed in claim 12, wherein the (meth)acryl resin includes a repeating unit derived from an alkyl (meth)acrylate monomer selected from n-butyl (meth)acrylate, ethyl (meth)acrylate, propyl (meth)acrylate, t-butyl (meth)acrylate and isobutyl (meth)acrylate, pentyl (meth)acrylate, hexyl (meth)acrylate, heptyl (meth)acrylate, isooctyl (meth)acrylate, octyl (meth)acrylate, nonyl (meth)acrylate, decyl (meth)acrylate, undecyl (meth)acrylate, lauryl (meth)acrylate, methyl (meth)acrylate, isobornyl (meth)acrylate, cyclohexyl (meth)acrylate, or a combination thereof.

14. The separator as claimed in claim 12, wherein the (meth)acryl resin is included in an amount of 10 wt % to 80 wt %, based on a total weight of the binder.

15. A rechargeable lithium battery, comprising:
    a positive electrode;
    a negative electrode; and
    the separator as claimed in claim 1 between the positive electrode and the negative electrode.

* * * * *